United States Patent
Monden

(10) Patent No.: US 10,751,818 B2
(45) Date of Patent: Aug. 25, 2020

(54) CUTTER FOR SKIVING AND GEAR MANUFACTURING METHOD USING SAME

(71) Applicant: MITSUBISHI HEAVY INDUSTRIES MACHINE TOOL CO., LTD., Ritto-shi, Shiga (JP)

(72) Inventor: Tetsuji Monden, Ritto (JP)

(73) Assignee: MITSUBISHI HEAVY INDUSTRIES MACHINE TOOL CO., LTD., Ritto-Shi (JP)

( * ) Notice: Subject to any disclaimer, the term of this patent is extended or adjusted under 35 U.S.C. 154(b) by 0 days.

(21) Appl. No.: 15/776,458

(22) PCT Filed: Aug. 4, 2016

(86) PCT No.: PCT/JP2016/072882
§ 371 (c)(1),
(2) Date: May 16, 2018

(87) PCT Pub. No.: WO2017/163444
PCT Pub. Date: Sep. 28, 2017

(65) Prior Publication Data
US 2018/0326520 A1 Nov. 15, 2018

(30) Foreign Application Priority Data

Mar. 25, 2016 (JP) ................. 2016-061134

(51) Int. Cl.
*B23F 5/16* (2006.01)
*B23F 21/10* (2006.01)
*B23F 21/04* (2006.01)

(52) U.S. Cl.
CPC ................ *B23F 5/16* (2013.01); *B23F 5/163* (2013.01); *B23F 21/04* (2013.01); *B23F 21/10* (2013.01)

(58) Field of Classification Search
CPC .......... B23F 5/163; B23F 5/16; B23F 21/245; B23F 21/16; B23F 21/10; B23F 21/04; B23F 15/06
See application file for complete search history.

(56) References Cited

U.S. PATENT DOCUMENTS

2014/1010569    4/2014  Vogel
2014/0314504 A1  10/2014  Vogel et al.
(Continued)

FOREIGN PATENT DOCUMENTS

CA    2935533 A1 * 12/2015 ............. B23F 21/10
CN    103635280 A    3/2014
(Continued)

OTHER PUBLICATIONS

International Preliminary Report on Patentability and Written Opinion of the International Searching Authority(Forms PCT/IB/338, PCT/IB/373 PCT/ISA/220 and PCT/ISA/237), dated Oct. 4, 2018, for International Application No. PCT/JP2016/072882, with an Engish Translation of the Written Opinion.
(Continued)

*Primary Examiner* — Nicole N Ramos
(74) *Attorney, Agent, or Firm* — Birch, Stewart, Kolasch & Birch, LLP

(57) ABSTRACT

Provided is a cutter for skiving that includes cutting teeth that are disposed side by side in a longitudinal direction of tooth grooves and have tooth heights set so as to increase from a downstream side toward an upstream side in a cutting direction, and cutting teeth that are disposed side by side in a longitudinal direction of cutting edge grooves and have tooth heights set so as to incrementally increase from a downstream side toward an upstream side in a rotational direction for each number M of tooth trace patterns (where M is the smallest natural number of at least 2) derived by Equation (1) below. St:Sc=M:N (1), where St is a number of
(Continued)

the tooth grooves, Sc is a number of the cutting edge grooves, and N is a number of patterns (where N is the smallest natural number) on a cutting face.

3 Claims, 9 Drawing Sheets

(56) References Cited

U.S. PATENT DOCUMENTS

| | | |
|---|---|---|
| 2016/0318110 A1 | 11/2016 | Kikuchi et al. |
| 2017/0252843 A1* | 9/2017 | Matsubara .............. B23F 21/12 |

FOREIGN PATENT DOCUMENTS

| | | |
|---|---|---|
| CN | 104148747 A | 11/2014 |
| EP | 0106913 A2 | 5/1984 |
| EP | 1688202 A1 | 8/2006 |
| JP | 2014-210335 A | 11/2014 |
| WO | WO 2015/182264 A1 | 12/2015 |
| WO | WO 2016/054146 A1 | 4/2016 |

OTHER PUBLICATIONS

International Search Report (Form PCT/ISA/210), dated Aug. 30, 2016, for International Application No. PCT/JP2016/072882, with an English translation.
Chinese Office Action for Application No. 201680066666.4, dated Dec. 6, 2018.
Indian Office Action for Application No. 201817018166 dated Mar. 19, 2020.

* cited by examiner

CUTTER FOR SKIVING AND GEAR MANUFACTURING METHOD USING SAME

TECHNICAL FIELD

The present invention relates to a cutter for skiving that generates a gear by skiving, and a gear manufacturing method using the same.

BACKGROUND ART

When an internal gear is generated, for example, it is difficult to use a general hobbing machine and thus a gear shaper is usually used. To generate an internal gear by use of this gear shaper, gear shaping is usually performed. In this process, an annular workpiece is cut into a tooth profile by linearly moving a shaper cutter in an axial direction of the workpiece while rotating the workpiece and the shaper cutter relative to each other, performing gear cutting in the axial direction of the workpiece on an area of an inside surface of the workpiece in a circumferential direction, and repeating this step for all the areas of the inside surface of the workpiece in the circumferential direction.

In such gear shaping, in order to machine all the areas of the workpiece in the circumferential direction, the shaper cutter is moved back and forth (machining stroke and return stroke) in the axial direction of the workpiece a plurality of times in accordance with a circumferential length of the workpiece. Hence, an action that does not directly contribute to the gear cutting (return stroke) needs to be performed, which lowers the processing efficiency. In view of this, in recent years, skiving has drawn attention which requires no backward moving action of a shaper cutter or the like (return stroke) and involves cutting all the areas in the circumferential direction of the inside surface of an annular workpiece into a tooth profile in the axial direction in one forward moving action of the shaper cutter or the like (machining stroke) in the axial direction of the workpiece with the workpiece and the shaper cutter rotated relative to each other.

In this skiving, the cutter continuously cuts all the areas of the workpiece in the circumferential direction. Thus, load on the cutting edges of the cutter is larger than with the gear shaping, in which cutting is performed intermittently. For this reason, the life of the cutting edges of the cutter is shorter.

Here, in Patent Document 1 below, a cutter for skiving having a cylindrical shape includes a plurality of cutting teeth in the circumferential direction by having tooth grooves formed between circumferentially adjacent cutting teeth with the tooth grooves being formed into a helical shape, twisting in the axial direction. Cutting edge grooves are each formed in the cutting teeth so as to divide the cutting teeth into a plurality of sections in the length direction of the tooth grooves, thereby dispersing the load applied to the cutting edges to each cutting tooth and extending the life of the cutting edges.

Furthermore, in Patent Document 1 below, an outer periphery of the cutter for skiving described above is configured to have a tapered shape with an outside diameter of a first axial end side, which is a cutting edge side of the cutting teeth, smaller than an outside diameter of a second axial end side. In this way, a tooth height and a tooth thickness of the cutting teeth are made larger on a base end side in a cutting direction than on a tip side in the cutting direction. Thus, the amount of cutting of a workpiece can be further dispersed to different cutting teeth. Hence, the load on each single cutting edge is further reduced.

PRIOR ART DOCUMENTS

Patent Document

Patent Document 1: WO 2015/182264

SUMMARY OF THE INVENTION

Problem to be Solved by the Invention

In the cutter for skiving proposed in Patent Document 1, given, for example, 42 as a number St of the tooth grooves in the circumferential direction and 14 as a number Sc of the cutting edge grooves in the circumferential direction, there are three types of shape patterns in a rotational direction forming a tooth trace on each of the plurality of cutting teeth disposed side by side in a longitudinal direction of the tooth grooves, and one type of shape pattern in a cutting direction forming a cutting face (cutting edge) on the plurality of cutting teeth disposed side by side in a longitudinal direction of the cutting edge grooves. That is, in the cutter for skiving, given M:N as a ratio of the number St of tooth grooves to the number Sc of cutting edge grooves, M is the number of tooth trace patterns (types; where M is the smallest natural number), and N is the number of cutting face (cutting edge) patterns (types; where N is the smallest natural number). Thus, the cutter for skiving described above has three types of tooth trace patterns disposed in order in the rotational direction, and the same cutting face pattern disposed in the cutting direction.

In the skiving of an internal gear using such a cutter for skiving as described above, when a value (L/M) obtained by dividing a number L of teeth (the number of tooth grooves) of the gear by the number M of tooth trace patterns of the cutter has a remainder (is not divisible), the cutting teeth of different rows of the cutter having the tooth trace pattern each perform machining for a single tooth groove of the gear. And, when the value (L/M) obtained by dividing the number L of teeth (number of tooth grooves) of the gear by the number M of tooth trace patterns of the cutter does not have a remainder (is divisible and a natural number), the cutting teeth of the same row of the cutter having the tooth trace pattern always perform machining for a single tooth groove of the gear.

Here, when the outer periphery of the cutter for skiving described above has a tapered shape, the tooth heights (the height positions of the tooth crests) of the plurality of cutting teeth disposed side by side in the longitudinal direction of the tooth grooves are less (lower) on the first end side than on the second end side in the axial direction, in other words, gradually increase (become higher) from a downstream side toward an upstream side in the cutting direction. Further, the tooth heights (the height positions of the tooth crests) of the plurality of cutting teeth disposed side by side in the longitudinal direction of the cutting edge grooves are also less (lower) on the first end side than the second end side in the axial direction, in other words, gradually increase (becomes higher) from a downstream side toward an upstream side in the rotational direction.

Thus, when an attempt is made to skive an internal gear with a natural (divisible) number as the above-described value (L/M) using the cutter for skiving described above provided with the outer periphery that forms a tapered shape, the load applied to the cutting edge of a single cutting tooth of the cutter varies per tooth trace pattern, possibly causing differences in wear of the cutting edges of the cutting teeth per tooth trace pattern and, as a result, causing uneven wear to occur. This is explained below in slightly more detail using a schematic view.

For example, in a cutter for skiving having 3 as the number M of tooth trace patterns and 1 as the number N of cutting face patterns (refer to FIG. 4), when the tooth crests (outer peripheries) of arranged cutting teeth A1 to A3, B1 to B3, and C1 to C3 are formed into tapered shapes, the tooth heights (height positions of the tooth crests) of the cutting teeth A1 to A3, B1 to B3, and C1 to C3 disposed side by side in a longitudinal direction Dc of the cutting edge grooves gradually increase (become higher) from a downstream side toward an upstream side in a rotational direction Dr (refer to FIG. 8), and the tooth heights (height positions of the tooth crests) of the cutting teeth A1 to A3, B1 to B3, and C1 to C3 disposed side by side in a longitudinal direction Dt of the tooth grooves also gradually increase (become higher) from a downstream side to an upstream side in a cutting direction Dg (refer to FIG. 9).

When an internal gear having the value (L/M) with a remainder is skived using the above-described cutter for skiving configured with an outer periphery that forms a tapered shape as described above, the cutting teeth A1 to A3, B1 to B3, and C1 to C3 of different rows of the cutter having the tooth trace pattern each perform machining for a single tooth groove of the gear (refer to FIG. 10), making it possible to even out the load applied to the cutting edges of each of the cutting teeth A1 to A3, B1 to B3, and C1 to C3 of each tooth trace pattern and thus suppress variance in the amount of abrasion of the cutting edges of the cutting teeth A1 to A3, B1 to B3, and C1 to C3 for each tooth trace pattern.

Conversely, when an internal gear having a natural (divisible) number as the value (L/M) is skived, only the cutting teeth A1 to A3, B1 to B3, and C1 to C3 of the same row of the cutter having the tooth trace pattern perform machining for a single tooth groove of the gear (refer to FIG. 9), causing variance to occur in the load applied to the cutting edges of each of the cutting teeth A1 to A3, B1 to B3, and C1 to C3 for each tooth trace pattern and thus uneven wear to occur in the cutting teeth A1 to A3, B1 to B3, and C1 to C3.

Therefore, an object of the present invention is to provide a cutter for skiving that further disperses an amount of cutting to each cutting tooth to further decrease a load applied to a single cutting edge in the same manner as when an outer periphery is formed into a tapered shape and, even when a value (L/M) obtained by dividing a number L of teeth (the number of tooth grooves) of a gear generated in a workpiece by a number M of tooth trace patterns is a natural number, evens out a load applied to the cutting edges of the cutting teeth of each tooth trace pattern, making it possible to suppress variation in an amount of abrasion of the cutting edges of the cutting teeth of each tooth trace pattern, and a gear manufacturing method that uses the same.

Means for Solving the Problem

A cutter for skiving according to a first aspect of the present invention for solving the above-described problems is a cutter for skiving having a cylindrical shape and configured to generate a gear. The cutter for skiving includes a plurality of cutting teeth arranged in a circumferential direction, a tooth groove formed between the cutting teeth circumferentially adjacent to each other, the tooth groove having a helical shape twisting in an axial direction, and a cutting edge groove formed in each of the cutting teeth such that the cutting tooth is divided into a plurality of sections in a longitudinal direction of the tooth grooves and a plurality of the cutting teeth are provided in an axial direction with a cutting edge and a cutting face formed on each of the cutting teeth on one side thereof in the axial direction. The cutting teeth disposed side by side in the longitudinal direction of the tooth grooves have tooth heights set to increase from a first side toward a second side in the axial direction. The cutting teeth disposed side by side in a longitudinal direction of the cutting edge grooves have tooth heights set to incrementally increase from a downstream side toward an upstream side in a rotational direction for each number M of tooth trace patterns (where M is the smallest natural number of at least 2) derived by Equation (1) below.

$$St:Sc=M:N \qquad (1)$$

In Equation (1), St is a number of the tooth grooves, Sc is a number of the cutting edge grooves, and N is a number of patterns (where N is the smallest natural number) on the cutting face.

Further, the cutter for skiving according to a second aspect of the present invention is that according to the first aspect, an outer periphery thereof has a barrel shape configured such that an outside diameter of an axial center portion is greater than an outside diameter of both axial end sides.

Additionally, a gear manufacturing method according to a third aspect of the present invention is a method for manufacturing the gear having a natural number as a value (L/M) obtained by dividing a number L of teeth of the gear by a number M of tooth trace patterns by performing skiving using the cutter for skiving according to the first or second aspect of the present invention.

Effect of Invention

According to the present invention, an amount of cutting is further dispersed to each cutting tooth to further decrease a load applied to each cutting edge in the same manner as when an outer periphery is formed into a tapered shape and, even when a value (L/M) obtained by dividing a number L of teeth (the number of tooth grooves) of a gear generated in a workpiece by a number M of tooth trace patterns is a natural number, a load applied to the cutting edges of the cutting teeth of each tooth trace pattern is made uniform, making it possible to suppress variation in an amount of abrasion of the cutting edges of the cutting teeth of each tooth trace pattern.

DESCRIPTION OF THE PREFERRED EMBODIMENTS

Embodiments of a cutter for skiving and a gear manufacturing method that uses the same according to the present invention will now be described with reference to the drawings. However, the present invention is not limited to the embodiments described hereafter with reference to the drawings.

Main Embodiment

A main embodiment of a cutter for skiving and a gear manufacturing method that uses the same according to the present invention will now be described with reference to FIGS. 1 to 7B.

Figure 1:
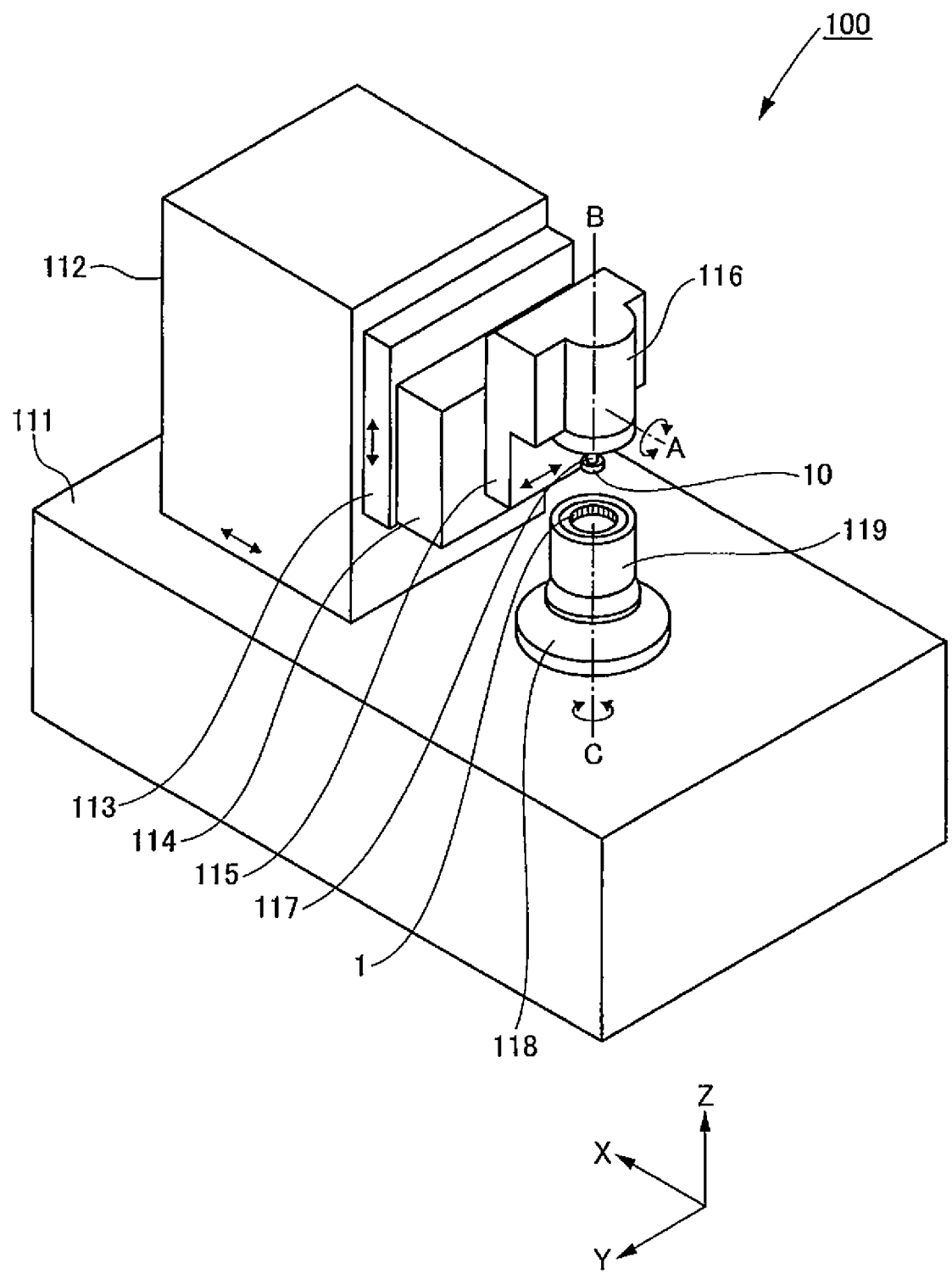
FIG. 1 is a general structural view of a skiving machine used in a main embodiment of a cutter for skiving according to the present invention.

FIG. 1 illustrates a general structure of a skiving machine. A column 112 is supported on a bed 111 so as to be movable in a horizontal X-axis direction. A saddle 113 is supported on the column 112 so as to be capable of being raised and lowered in a vertical Z-axis direction. A swivel head 114 is supported on the saddle 113 so as to be capable of swiveling about a horizontal tool swivel axis A. A slide head 115 is supported on the swivel head 114 so as to be moveable in a horizontal Y-axis direction. A main spindle 116 is provided on the slide head 115.

A tool arbor 117 is supported on the main spindle 116 so as to be rotatable about a tool rotation axis B. A cutter for skiving 10 having a cylindrical shape is detachably mounted to a lower end of the tool arbor 117, and is capable of being swiveled about the tool swivel axis A, moved in the Y-axis direction, and rotated about the tool rotation axis B by actuation of the heads 114 to 116, respectively.

On the other hand, a rotary table 118 is provided at a position on the bed 111 in front of the column 112 so as to be capable of being rotated about a vertical workpiece rotation axis C. A fixture 119 having a cylindrical shape is attached to an upper surface of the rotary table 118. A workpiece 1 which is an internal gear is detachably attached to an inside surface of an upper end of the fixture 119. This workpiece 1 can be rotated about the workpiece rotation axis C by actuation of the rotary table 118.

Figure 2A:
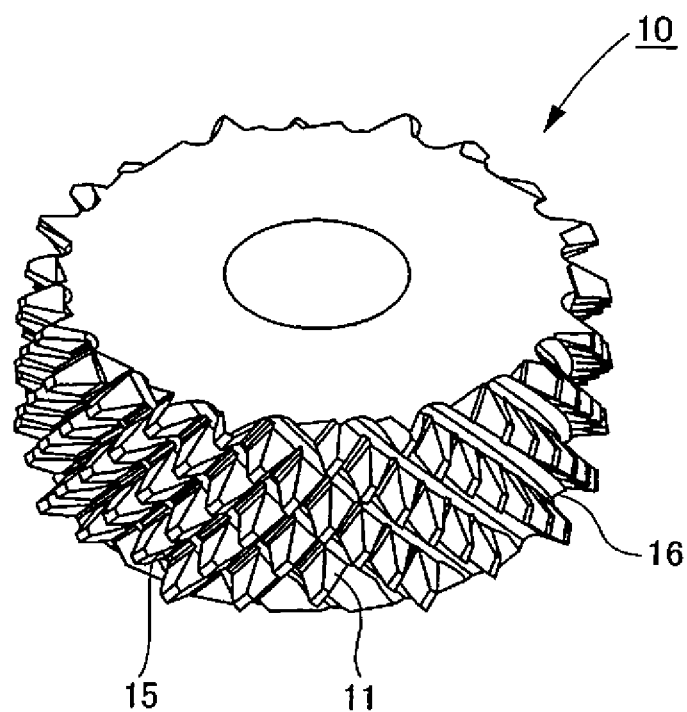
FIG. 2A is a general perspective view of the cutter for skiving in FIG. 1.
Figure 2B:
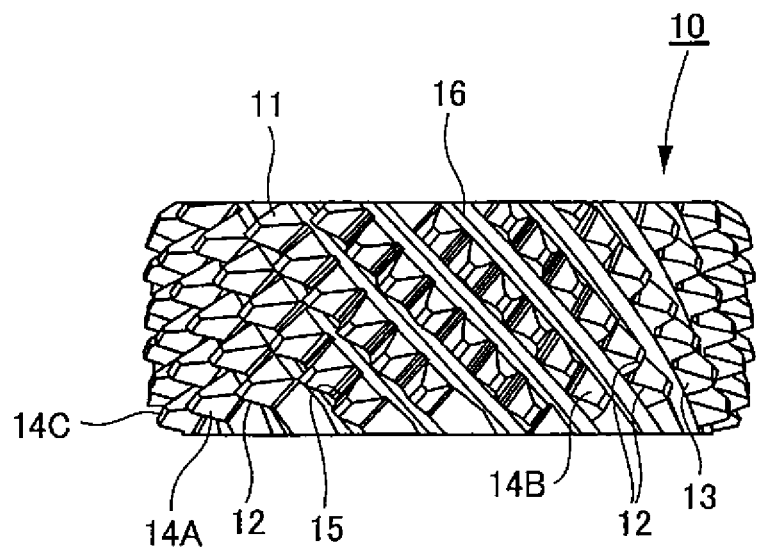
FIG. 2B is a general perspective view of the cutter for skiving in FIG. 1.

FIGS. 2A and 2B illustrate a general outer appearance of the cutter for skiving 10. In FIGS. 2A and 2B, reference signs 11, 12, 13, 14A as well as 14B, and 14C denote an cutting tooth, a cutting edge, a cutting face, a flank, and a tooth crest, respectively.

A plurality of the cutting teeth 11 are formed in a circumferential direction with a plurality of tooth grooves 15 each provided between circumferentially adjacent cutting teeth 11. These tooth grooves 15 have a helical shape twisting in the axial direction. Then, cutting edge grooves 16 are formed so as to divide each of the cutting teeth 11 into a plurality of sections in a longitudinal direction of the tooth grooves 15. Thus, a plurality of cutting teeth 11 are provided also in the axial direction with the cutting edge 12 and the cutting face 13 formed on one side in the axial direction (the left lower side in FIG. 2B) of each of the cutting teeth 11.

Figure 3:
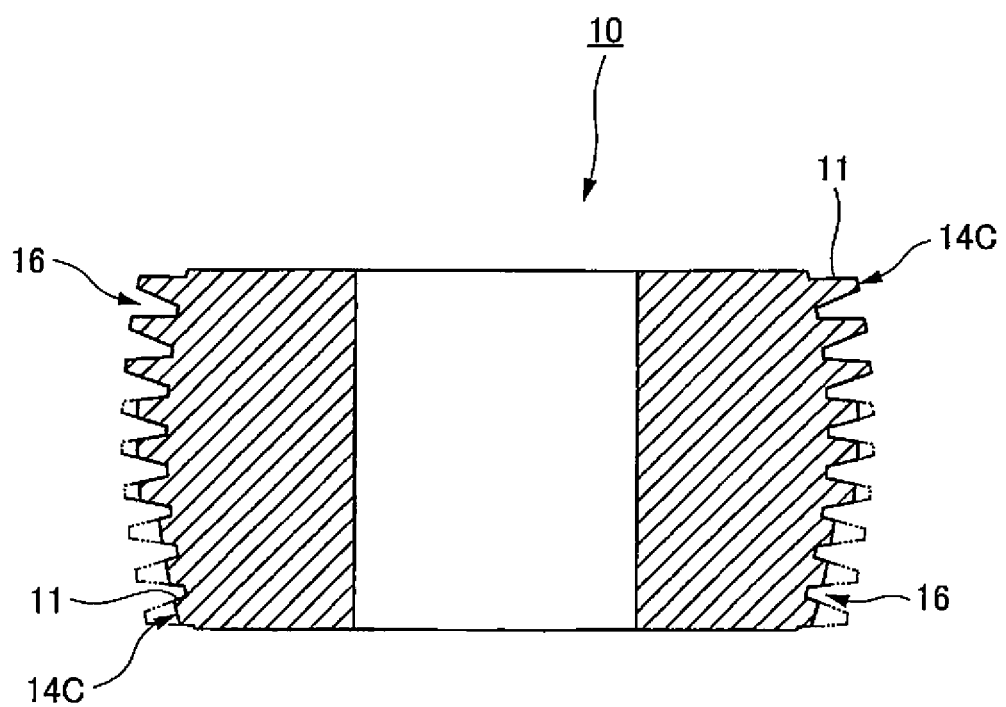
FIG. 3 is a general cross-sectional view of the cutter for skiving in FIG. 1 with features thereof exaggerated for ease of understanding.

FIG. 3 illustrates a general cross section of the cutter for skiving 10 in FIG. 1 with the features thereof exaggerated for ease of understanding. The cutter for skiving 10 has a barrel shape configured so that an outer circumferential surface thereof forms a circular arc in the axial direction with an outside diameter of an axial center portion being greater than an outside diameter of both axial end sides.

In the cutter for skiving 10, the cutting teeth 11 disposed side by side in a longitudinal direction of the tooth grooves 15 have tooth heights (height positions of the tooth crests 14C) set so as to increase (become higher) from a first side (a downstream side in FIG. 3) toward a second side (an upstream side in FIG. 3) in the axial direction, in other words, decrease (become lower) from the second side (the upstream side in FIG. 3) toward the first side (the downstream side in FIG. 3) in the axial direction. Further, the cutting teeth 11 disposed side by side in a longitudinal direction of the cutting edge grooves 16 have tooth heights set so as to incrementally increase from a downstream side toward an upstream side in a rotational direction for each number M of tooth trace patterns (where M is the smallest natural number of at least 2) derived by Equation (1) below.

$$St:Sc = M:N \tag{1}$$

In Equation (1), St is a number of the tooth grooves 15, Sc is a number of the cutting edge grooves 16, and N is a number of patterns (where N is the smallest natural number) on the cutting face 13.

This is explained below in slightly more detail using a schematic view.

Figure 4:
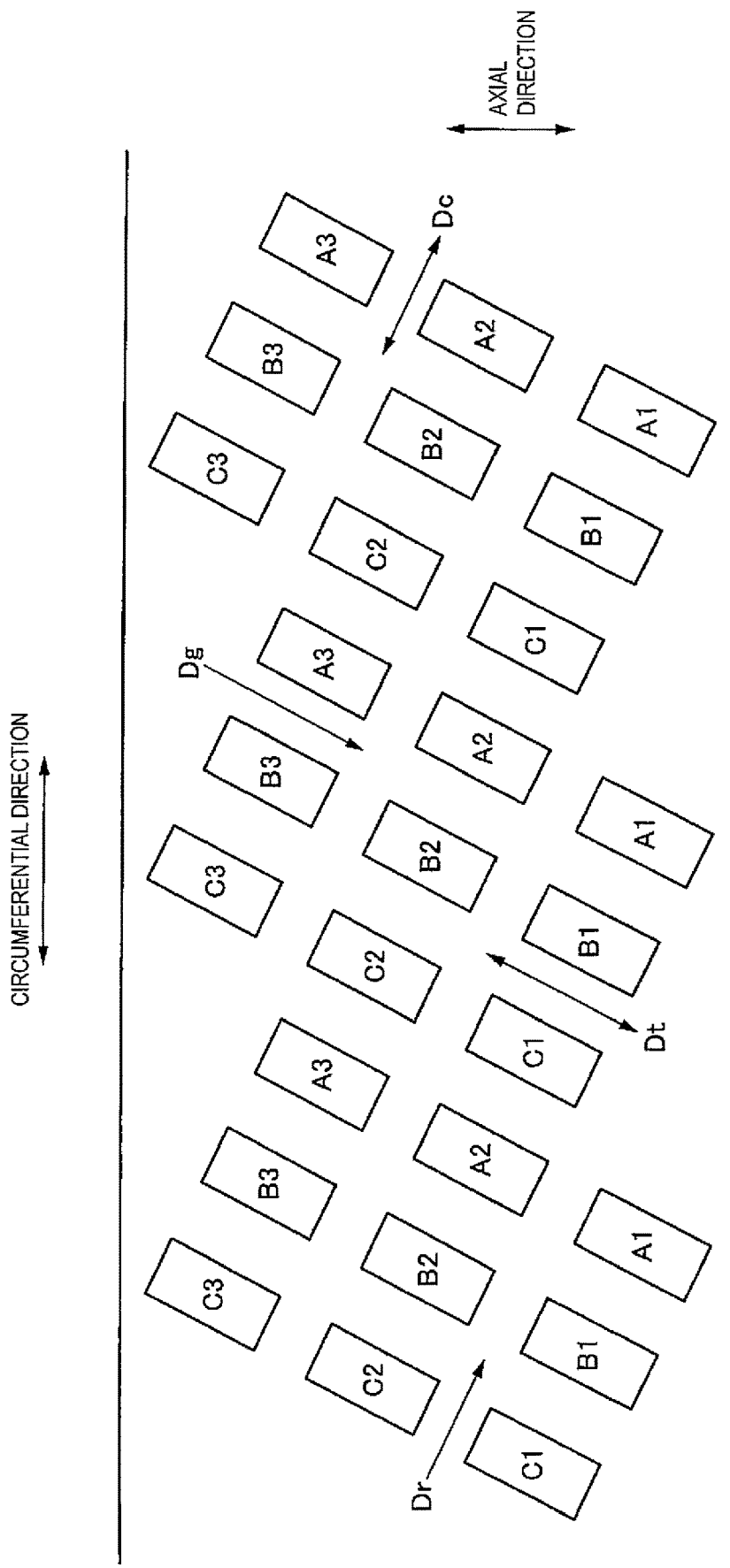
FIG. 4 is a schematic explanatory diagram of an array of cutting teeth of the cutter for skiving.
Figure 5:
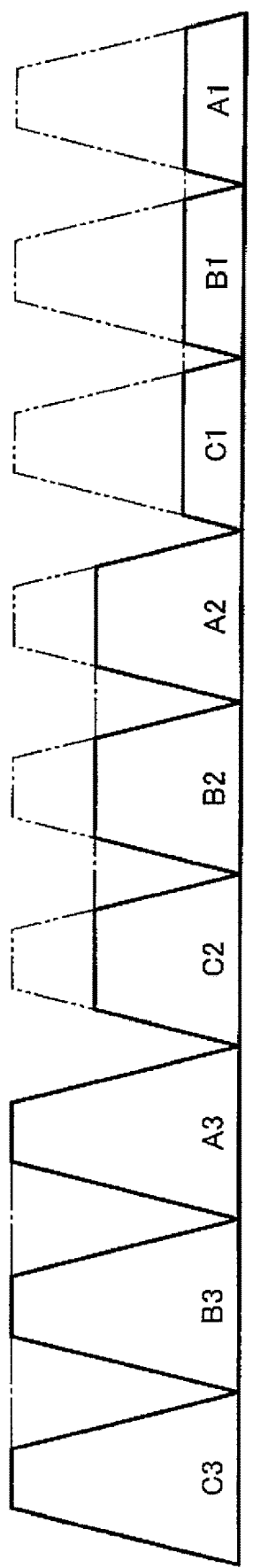
FIG. 5 is a schematic explanatory diagram of the cutting teeth disposed side by side in a longitudinal direction of cutting edge grooves of the cutter for skiving of the main embodiment, as viewed from a cutting face direction.
Figure 6:
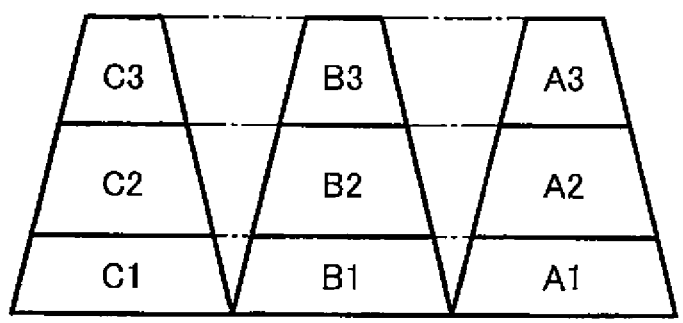
FIG. 6 is a schematic explanatory diagram of the cutting teeth disposed side-by-side in a longitudinal direction of tooth grooves of the cutter for skiving of the main embodiment, as viewed from the cutting face direction.
Figure 7A:
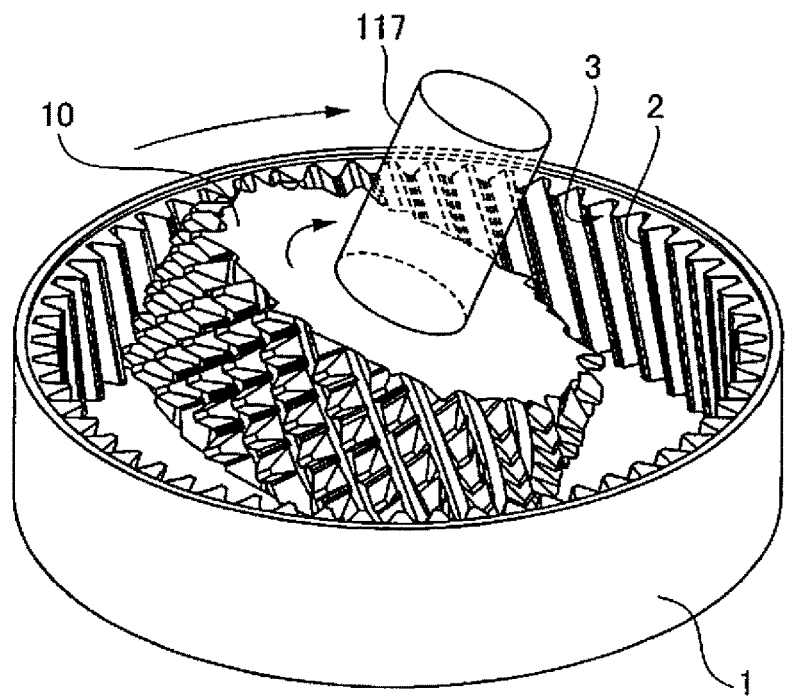
FIG. 7A is an explanatory diagram of a gear manufacturing method that uses the cutter for skiving of FIG. 1.
Figure 7B:
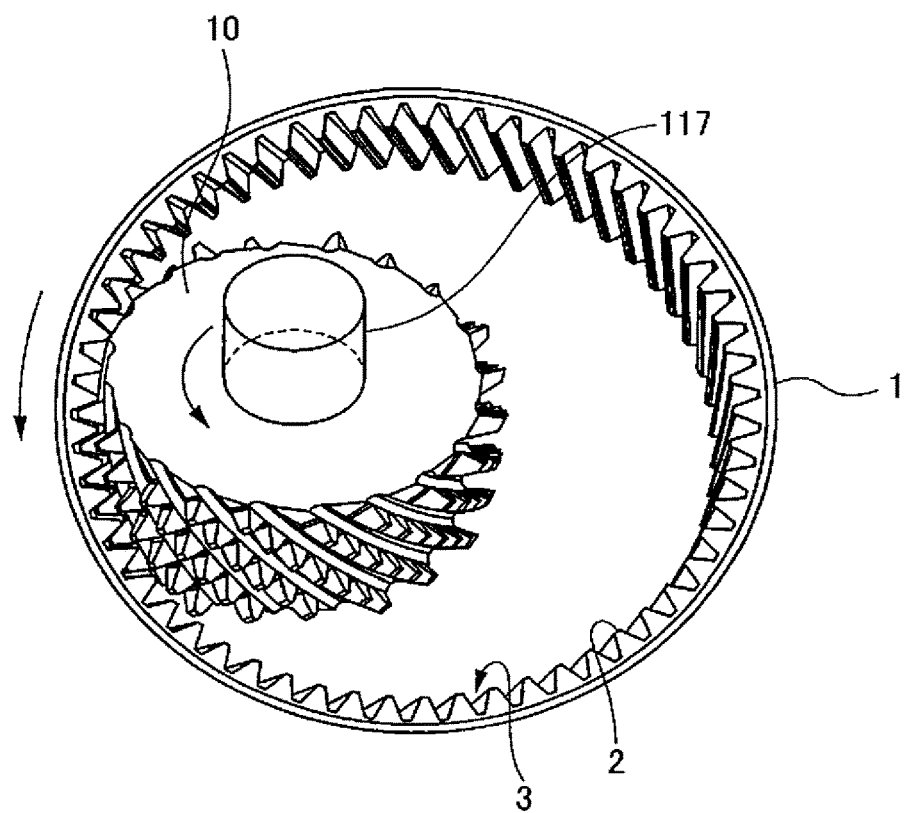
FIG. 7B is a diagram of FIG. 7A as viewed from below.
Figure 8:
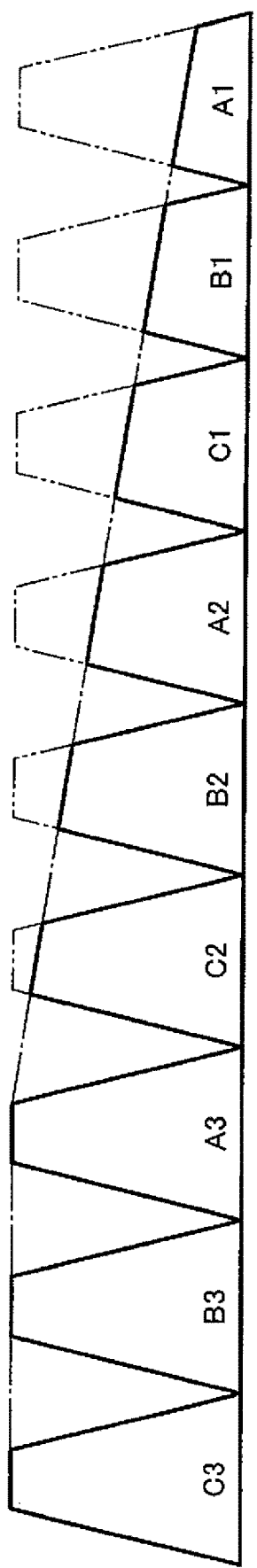
FIG. 8 is a schematic explanatory diagram of the cutting teeth disposed side by side in the longitudinal direction of the cutting edge grooves in an example of a cutter for skiving of the related art, as viewed from the cutting face direction.
Figure 9:
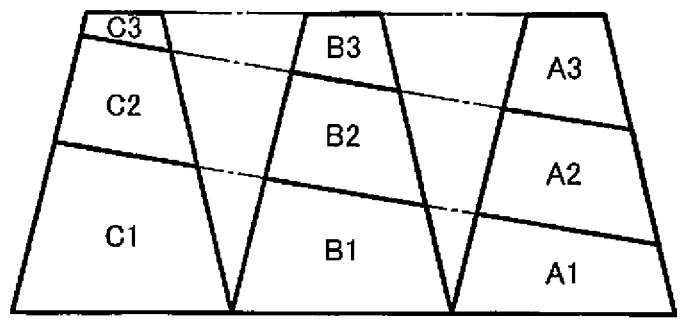
FIG. 9 is a schematic explanatory diagram of the cutting teeth disposed side-by-side in the longitudinal direction of the tooth grooves in the example of the cutter for skiving of the related art, as viewed from the cutting face direction.
Figure 10:
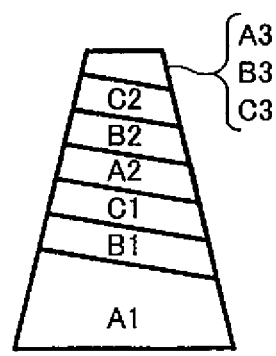
FIG. 10 is an explanatory diagram of action when a gear is manufactured using the example of the cutter for skiving of the related art.

FIG. 4 schematically illustrates an array of cutting teeth of a cutter for skiving having 3 as the number M of tooth trace patterns and 1 as the number N of cutting face patterns, FIG. 5 schematically illustrates the cutting teeth disposed side by side in the longitudinal direction of the cutting edge grooves as viewed from the cutting face direction, and FIG. 6 schematically illustrates the cutting teeth disposed side by side in the longitudinal direction of the tooth grooves as viewed from the cutting face direction. In these FIGS. 4 to 6, A1 to A3, B1 to B3, and C1 to C3 denote the cutting teeth.

As illustrated in FIGS. 4 and 6, the cutting teeth A1 to A3, B1 to B3, and C1 to C3 disposed side by side in a longitudinal direction Dt of the tooth grooves have tooth heights (height positions of the tooth crests) set so as to increase (become higher) from a downstream side (the downstream side in FIG. 4) to an upstream side (the upstream side in FIG. 4) of a cutting direction Dg. Further, as illustrated in FIGS. 4 and 5, the cutting teeth A1 to A3, B1 to B3, and C1 to C3 disposed side by side in a longitudinal direction Dc of the cutting edge grooves have tooth heights (height positions of the tooth crests) set so as to incrementally increase (become higher) from a downstream side (the right side in FIGS. 4 and 5) to an upstream side (the left side in FIGS. 4 and 5) of a rotational direction Dr, three at a time.

Next, a method for manufacturing an internal gear having a natural number as the value (L/M) obtained by dividing a number L of teeth (the number of tooth grooves) by a number M of tooth trace patterns (=3) using the above-described cutter for skiving 10 configured with an outer periphery that forms a stepped shape (incrementally increases) will be described.

First, the cutter for skiving 10 is mounted to the tool arbor 117 of a skiving machine 100, the workpiece 1 that is to form the internal gear is mounted to the fixture 119, and the column 112, the saddle 113, the swivel head 114, and the slide head 115 are driven to move the cutter for skiving 10 in the X-axis, Y-axis, and Z-axis directions, swivel the cutter for skiving 10 about the tool swivel axis A to form an axial angle Σ in accordance with a helix angle of the workpiece 1, and dispose the cutter for skiving 10 on an inner side of the workpiece 1.

Then, the column 112 is driven to move the cutter for skiving 10 in the X-axis direction (toward the left side in FIG. 1), the main spindle 116 is driven to rotate the cutter for skiving 10 about the tool rotation axis B, and the rotary table 118 is driven to rotate the workpiece 1 about the workpiece rotation axis C.

Further, the column 112 and the saddle 113 are driven to move the cutter for skiving 10 in the X-axis direction by an amount corresponding to a target cutting amount, and subsequently move the cutter for skiving 10 in the Z-axis direction. As a result, the cutter for skiving 10 cuts the inside surface of the workpiece 1 in the circumferential direction and the axial direction into a tooth profile so that the entire inside surface of the workpiece 1 is skived into the tooth profile (refer to FIGS. 7A and 7B).

At this time, an internal gear having a natural (divisible) number as the value (L/M) obtained by dividing the number of teeth 2 (the number of tooth grooves 3) generated in the workpiece 1 by M (=3) is manufactured and thus, for a single tooth groove 3 of the workpiece 1, the cutter for skiving 10 performs skiving only on the cutting teeth A1 to A3, B1 to B3, and C1 to C3 disposed in the same row of the tooth trace pattern (refer to FIG. 6).

Here, in the cutter for skiving 10, as previously described, the cutting teeth A1 to A3, B1 to B3, and C1 to C3 disposed side by side in the longitudinal direction Dc of the cutting edge grooves have tooth heights (height positions of the tooth crests) set so as to incrementally increase (become higher) from the downstream side (the right side in FIGS. 4 and 5) to the upstream side (the left side in FIGS. 4 and 5) of the rotational direction Dr, three at a time, and the cutting teeth A1 to A3, B1 to B3, and C1 to C3 disposed side by side in the longitudinal direction Dt of the tooth grooves have tooth heights (height positions of the tooth crests) set so as to increase (become higher) from the downstream side (the downstream side in FIG. 4) to the upstream side (the upstream side in FIG. 4) of the cutting direction Dg.

As a result, the load applied to the cutting edges of each of the cutting teeth A1 to A3, B1 to B3, and C1 to C3 of each of the tooth trace patterns of the cutter for skiving 10 is uniform, making it possible to suppress variance in the amount of abrasion of the cutting edges of the cutting teeth A1 to A3, B1 to B3, and C1 to C3 for each of the tooth trace patterns (refer to FIG. 6).

Thus, according to the present embodiment, the plurality of cutting edges are provided in the axial direction, making it possible to disperse and decrease the load applied to a single cutting edge. Furthermore, an amount of cutting is further dispersed to each of the cutting teeth A1 to A3, B1 to B3, and C1 to C3 to further decrease a load applied to a single cutting edge in the same manner as when the outer periphery is formed into a tapered shape and, even when the value (L/M) obtained by dividing the number L of teeth (the number of tooth grooves) of an internal gear generated in the workpiece 1 by the number M of tooth trace patterns is a (divisible) natural number without a remainder, a load applied to the cutting edges of each of the cutting teeth A1 to A3, B1 to B3, and C1 to C3 of each tooth trace pattern is made uniform, making it possible to suppress variation in an amount of abrasion of the cutting edges of the cutting teeth A1 to A3, B1 to B3, and C1 to C3 of each tooth trace pattern.

Further, the cutter for skiving 10 has a barrel shape configured so that the outer circumferential surface thereof forms a circular arc in the axial direction with the outside diameter of the axial center portion being greater than the outside diameter of both axial end sides, making it possible to increase a crossed axis angle with respect to the workpiece 1. As a result, a sliding velocity of the cutter 10 relative to the workpiece 1 can be increased, and a cutting ability can be improved.

INDUSTRIAL APPLICABILITY

The cutter for skiving and the gear manufacturing method using the same according to the present invention can be utilized significantly beneficially in the industry of cutting such as gear machining.

REFERENCE NUMERALS

1 Workpiece
2 Tooth
3 Tooth groove
10 Cutter for skiving
11 Cutting tooth
12 Cutting edge
13 Cutting face
14A, 14B Flank
14C Tooth crest
15 Tooth groove
16 Cutting edge groove
100 Skiving machine
111 Bed
112 Column
113 Saddle
114 Swivel head
115 Slide head
116 Main spindle
117 Tool arbor
118 Rotary table
119 Fixture

The invention claimed is:

1. A cutter for skiving having a cylindrical shape and configured to generate a gear, comprising:
   a plurality of cutting teeth arranged in a circumferential direction;
   a tooth groove formed between the cutting teeth circumferentially adjacent to each other, the tooth groove having a helical shape twisting in an axial direction; and
   a cutting edge groove formed in each of the cutting teeth such that the cutting tooth is divided into a plurality of sections in a longitudinal direction of the tooth grooves and a plurality of the cutting teeth are provided in an axial direction with a cutting edge and a cutting face formed on each of the cutting teeth on one side thereof in the axial direction;

the cutting teeth disposed side by side in the longitudinal direction of the tooth grooves having tooth heights set to increase from a first side toward a second side in the axial direction; and the cutting teeth disposed side by side in a longitudinal direction of the cutting edge grooves having tooth heights set to incrementally increase from a downstream side toward an upstream side in a rotational direction for each number M of tooth trace patterns derived by Equation (1):

$$St:Sc=M:N \qquad (1),$$

where M being the smallest natural number of at least 2, the M cutting teeth adjacent to one another in the longitudinal direction of the cutting edge grooves having the same heights, where St is a number of the tooth grooves, Sc is a number of the cutting edge grooves, and N is a number of patterns on the cutting face, N being the smallest natural number, the tooth trace patterns being the number of shape patterns forming a tooth trace on each of the plurality of cutting teeth disposed side by side in a longitudinal direction of the tooth grooves, the patterns on the cutting face being the number of shape patterns forming a cutting face on the plurality of cutting teeth disposed side by side in a longitudinal direction of the cutting edge grooves.

2. The cutter for skiving according to claim 1, wherein an outer periphery of the cutter has a barrel shape configured such that an outside diameter of an axial center portion is greater than an outside diameter of both axial end sides.

3. A gear manufacturing method for manufacturing the gear having a natural number as a value (L/M) obtained by dividing a number L of teeth of the gear by a number M of tooth trace patterns by performing skiving using the cutter for skiving according to claim 1.

* * * * *